(12) United States Patent
Braithwaite

(10) Patent No.: US 9,300,440 B2
(45) Date of Patent: Mar. 29, 2016

(54) RELAY NODE AND METHOD FOR RELAY NODE OPERATION WITH IMPROVED DATA THROUGHPUT FOR CELL-EDGE USERS

(71) Applicant: Richard Neil Braithwaite, Orange, CA (US)

(72) Inventor: Richard Neil Braithwaite, Orange, CA (US)

(73) Assignee: Intel Corporation, Santa Clara, CA (US)

( * ) Notice: Subject to any disclaimer, the term of this patent is extended or adjusted under 35 U.S.C. 154(b) by 67 days.

(21) Appl. No.: 14/565,181

(22) Filed: Dec. 9, 2014

(65) Prior Publication Data

US 2015/0163021 A1    Jun. 11, 2015

Related U.S. Application Data

(63) Continuation of application No. 13/324,599, filed on Dec. 13, 2011, now Pat. No. 8,918,692.

(60) Provisional application No. 61/423,944, filed on Dec. 16, 2010.

(51) Int. Cl.
| | |
|---|---|
| *H04L 1/18* | (2006.01) |
| *H04W 84/04* | (2009.01) |
| *H04B 7/155* | (2006.01) |
| *H04W 72/04* | (2009.01) |
| *H04L 1/00* | (2006.01) |

(52) U.S. Cl.
CPC .............. *H04L 1/1816* (2013.01); *H04B 7/155* (2013.01); *H04L 1/1887* (2013.01); *H04L 1/1893* (2013.01); *H04W 72/0406* (2013.01); *H04W 84/047* (2013.01); *H04L 2001/0097* (2013.01)

(58) Field of Classification Search
CPC ................ H04L 1/1887; H04L 1/1893; H04L 2001/0097; H04L 1/1816; H04B 7/155
USPC ........... 714/750, 751, 748, 749; 370/319, 328
See application file for complete search history.

(56) References Cited

U.S. PATENT DOCUMENTS

| | | | |
|---|---|---|---|
| 8,468,412 B2 * | 6/2013 | Cai et al. ........................ 714/748 |
| 8,837,440 B2 * | 9/2014 | Feng et al. ..................... 370/336 |
| 2005/0232183 A1 * | 10/2005 | Sartori et al. .................. 370/319 |
| 2010/0080139 A1 * | 4/2010 | Palanki ................ H04B 7/2606 370/252 |
| 2011/0149774 A1 * | 6/2011 | Chen et al. ..................... 370/252 |
| 2011/0255468 A1 * | 10/2011 | Vajapeyam et al. ........... 370/328 |
| 2012/0026935 A1 * | 2/2012 | Park et al. ...................... 370/315 |
| 2012/0069795 A1 * | 3/2012 | Chung et al. ................... 370/315 |
| 2012/0170504 A1 * | 7/2012 | Hoymann et al. ............. 370/312 |

* cited by examiner

*Primary Examiner* — David Ton
(74) *Attorney, Agent, or Firm* — Schwegman Lundberg & Woessner, P.A.

(57) ABSTRACT

A combination of repeaters and relays is used to improve the data throughput for user equipment ("UE") near the cell edge in a LTE network. Amplify-and-forward repeaters and decode-and-forward relays enhance the down-link and up-link, respectively. Relay assistance on the up-link occurs when the evolved Node B ("eNB") requests a retransmission (HARQ) from the UE at which point the UE and relay transmit simultaneously in a cooperative fashion. The quality of the up-link signal received by the eNB is improved due to a favorable channel through the relay. An analysis shows that relay assistance improves the throughput for a cell-edge user when the average delay per data transport block is allowed to increase.

21 Claims, 11 Drawing Sheets

RELAY NODE AND METHOD FOR RELAY NODE OPERATION WITH IMPROVED DATA THROUGHPUT FOR CELL-EDGE USERS

RELATED APPLICATION INFORMATION

The present application is a continuation of U.S. patent application Ser. No. 13/324,599, filed Dec. 13, 2011, now issued as U.S. Pat. No. 8,918,692, which claims priority under 35 U.S.C. Section 119(e) to U.S. Provisional patent application Ser. No. 61/423,944, filed Dec. 16, 2010, each of which is incorporated herein by reference in its entirety.

BACKGROUND OF THE INVENTION

1. Field of the Invention

The present invention relates in general to radio communication systems for wireless networks. More particularly, the invention is directed to cellular networks employing repeaters and relays.

2. Description of the Prior Art and Related Background Information

Within a wireless cellular communication network, a cell is defined by the coverage area of a base station where it can communicate successfully with a mobile user over the radio frequency ("RF") link. As shown in FIG. 1, within the Long Term Evolution ("LTE") network, the base station and mobile user are referred to as the evolved Node B ("eNB") 110 and user equipment ("UE") 120, respectively. The eNB 110 transmits signals to the UE 120 through the down-link 103, and the UE 120 transmits signals to the eNB 110 through the up-link 102. The UE 120 is operating near the cell edge 111, and is subjected to an unfavorable RF link due to distance-dependent path losses to the eNB 110. As a result, cell-edge users often experience the lowest data throughput within the cell. LTE-Advanced (release 10), an enhancement of LTE (release 8), seeks to increase the data throughput for these cell-edge users. See, for example, S. Parkvall and D. Astely, "The evolution of LTE towards IMT-advanced," *Journal of Communications*, Vol. 4, No. 3, pp. 146-154, April 2009.

Repeaters and relays are employed as means for improving the link budget by reducing the distance between transmitter and receiver, which, in turn, allows for higher data rates. A repeater receives and retransmits all signals within a defined bandwidth with minimal delay. It is an amplify-and-forward device. However, repeaters amplify and generate noise in the up-link and down-link bands which is problematic for many implementations. In contrast, a relay decodes the in-coming signal, then recodes and transmits. Such devices, referred to as decode-and-forward relays, have the advantage of removing noise and interference from the desired signal. It also allows for the selection of which signals are to be relay-assisted. Unfortunately, the delay caused by the decoding and encoding processes makes it necessary for the relay to wait for the eNB scheduler to assign new radio channel resources before retransmitting the data. Therefore, relays likewise have deficiencies which are problematic in many implementations.

Accordingly, a need exists to improve cellular networks employing repeaters and relays.

SUMMARY OF THE INVENTION

In a first aspect, the present invention provides a wireless communication system comprising a base station configured for communication within a cell, an up-link relay, and a down-link repeater co-located with the up-link relay. A donor antenna is coupled to the output of the up-link relay and further coupled to the input of the down-link repeater. A service antenna is coupled to the input of the up-link relay and further coupled to the output of the down-link repeater.

In a preferred embodiment, the wireless communication system preferably further comprises user equipment located within the cell, where the user equipment is configured for transmitting and receiving signals. The up-link relay preferably receives up-link signals, decodes the received up-link signals, recodes the decoded up-link signals, and transmits the recoded up-link signals. The down-link repeater preferably receives down-link signals, amplifies the received down-link signals, and re-transmits the amplified down-link signals. The wireless communication system preferably employs automatic repeat requests in response to errors detected in received signals. The base station preferably further comprises a scheduler configured for controlling resource allocation for the up-link and the down-link signals. The user equipment is preferably configured for transmitting control signals to the base station via an up-link control channel during a repeat request retransmission period. The up-link relay is preferably configured for transmitting data signals to the base station via an up-link shared channel during the repeat request retransmission period. The up-link relay is preferably configured for determining whether to re-transmit the up-link signals based on the operating protocol of the user equipment. The user equipment is preferably configured for transmitting control signals to the base station via an up-link control channel during a repeat request transmission period. The user equipment is preferably further configured for transmitting data signals to the base station via an up-link shared channel overlapping with the transmission of the control signals during the repeat request retransmission period. The up-link relay is preferably configured for transmitting the data signals to the base station via the up-link shared channel during the repeat request retransmission. The base station is preferably further configured for scheduling and resource allocation for the up-link signals within the wireless communication system. The up-link relay preferably emulates a second user equipment to extract timing advance information. The up-link relay preferably emulates a second user equipment periodically to maintain power control and receive timing advance updates. The user equipment is preferably further configured for transmitting control information directly to the base station when the up-link relay is transmitting.

In another aspect, the present invention provides a method for wireless communication in a network, the network having a base station, user equipment, and a co-located up-link relay and down-link repeater. The method comprises transmitting down-link signals from a base station, receiving the down-link signals transmitted from a base station by a down-link repeater via a donor antenna, transmitting the down-link signals from the repeater via a service antenna, and receiving the down-link signals by the user equipment. The method further comprises transmitting up-link signals by the user equipment, receiving up-link signals transmitted from the user equipment by an up-link relay via the service antenna, transmitting the up-link signals from the up-link relay via the donor antenna, and receiving the up-link signals by the base station.

In a preferred embodiment, the method for wireless communication in a network, the network having a base station, user equipment, and a co-located up-link relay and down-link repeater further comprises transmitting a repeat request from the base station to the user equipment and the up-link relay, transmitting up-link control signals from the user equipment to the base station during a retransmission period, transmitting up-link data signals from the up-link relay during the retransmission period, and receiving the up-link control and data signals by the base station. The method preferably further comprises performing an incremental redundancy function of the up-link data signals. The method preferably further comprises determining whether to transmit up-link signals from the up-link relay based on the operating protocol of the user equipment. The method preferably further comprises transmitting a repeat request from the base station to the user equipment and the up-link relay, transmitting up-link control and data signals from the user equipment to the base station during a retransmission period, transmitting up-link data signals from the up-link relay to the base station during the retransmission period, receiving the up-link control and data signals from the user equipment by the base station, receiving the up-link data signals from the up-link relay by the base station, and performing an incremental redundancy function of the up-link data signals from the user equipment and the up-link data signals from the up-link relay.

In another aspect, the present invention provides a method for wireless communication in a network, the network having a base station, user equipment, and a co-located up-link relay and down-link repeater. The method comprises transmitting down-link signals from a base station, receiving the down-link signals by a down-link repeater via a donor antenna, amplifying the down-link signals by a down-link repeater, transmitting the amplified down-linked signals to a user equipment via a service antenna, and receiving the amplified down-link signals by the user equipment. The method further comprises transmitting up-link signals from the user equipment, receiving the up-link signals transmitted by the user equipment by an up-link relay via the service antenna, decoding the up-link signals, re-encoding the decoded up-link signals, transmitting the re-encoded up-link signals to a base station via the donor antenna, and receiving the up-link signals by the base station.

In a preferred embodiment, the method for wireless communication in a network, the network having a base station, user equipment, and a co-located up-link relay and down-link repeater preferably further comprises transmitting an automatic repeat request from the base station to the user equipment and the up-link relay, transmitting up-link control signals via an up-link control channel from the user equipment to the base station during a retransmission period, transmitting up-link data signals via an up-link shared channel from the up-link relay during the retransmission period, and receiving the up-link control and data signals by the base station. The method preferably further comprises determining whether to transmit the up-link control signals based on the operating protocol of the user equipment. The method preferably further comprises transmitting a repeat request from the base station to the user equipment and the up-link relay, transmitting control signals to the base station from the user equipment via an up-link control channel during a repeat request transmission period, transmitting data signals to the base station from the user equipment via an up-link shared channel overlapping with the transmission of the control signals during the repeat request retransmission period, transmitting up-link data signal from the up-link relay via the up-link shared channel to the base station during the retransmission period, receiving the up-link control and data signals from the user equipment by the base station, receiving the up-link data signals from the up-link relay by the base station and performing an incremental redundancy function of the up-link data signals from the user equipment and the up-link data signals from the up-link relay.

Further features and aspects of the invention are set out in the following detailed description.

DETAILED DESCRIPTION OF THE INVENTION

Figure 1:
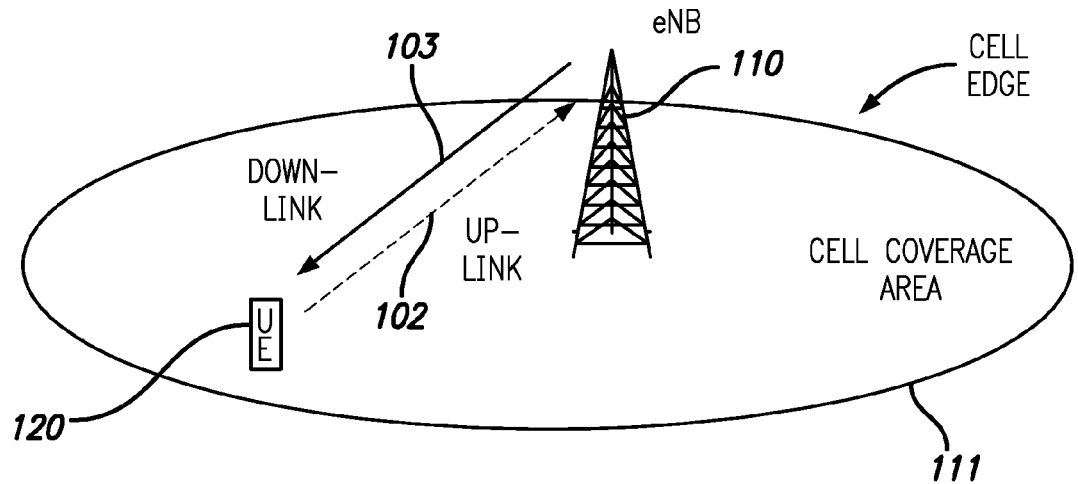
FIG. 1 is a representation of an evolved Node B ("eNB") base station and user equipment ("UE") for up-link and down-link communication.

Embodiments provide systems and methods for improving data throughput for cellular phones located near a cellular communication system, such as, for example, near an edge of a Long Term Evolution ("LTE") network. In an embodiment, a co-located up-link relay and a down-link repeater sharing common donor and service antennas are employed which have advantages as compared to conventional bi-directional relays and bi-directional repeaters. For example, conventional bi-directional repeaters generate noise across the entire up-link band which is more problematic for the up-link signal because the emission from user equipment ("UE") requiring amplification is only a small fraction of the up-link band. Moreover, conventional bi-directional relays exhibit problems with the down-link communication because the down-link HARQ is asynchronous which prevents the relay from predicting when the retransmission will be made by the eNB.

As used herein and consistent with well known terminology in the art, a repeater is an amplify-and-forward device which receives signals, amplifies the received signals, and re-transmits the signals within a defined bandwidth with minimal delay. A relay is a decode-and-forward device which receives signals, decodes the received signals, recodes the signals, and then transmits the recoded signals. Conventional repeaters are typically bi-directional devices which service both the up-link signals and the down-link signals. Likewise, conventional relays are also typically bi-directional devices which service both the up-link signals and the down-link signals. In contrast, embodiments described herein comprise a co-located up-link relay which services the up-link signals and a down-link repeater which services the down-link signals. Embodiments do not employ down-link relays but instead employ down-link repeaters.

Within this disclosure, the LTE specification will be used as a specific example of a preferred implementation of the invention. This, however, should not be taken as being limiting in nature.

Also within this disclosure, the hybrid automatic repeat request (HARQ) protocol is used as a means for the scheduler to assign up-link resources for the relay-to-eNB link. The result is a relay that is compatible with LTE release 10, and is largely compatible with LTE release 8. Note that the use of relays and repeaters for edge user capacity enhancement is a departure from the usually goal of coverage extension.

The discussion below provides a selected overview of LTE relevant to repeaters and relays including the HARQ protocol and the uplink channel structure. An overview of the operation of repeaters within LTE is also described below. The discussion also provides a relay overview for LTE. Embodiments for enhancing the cell-edge throughput performance combines up-link HARQ relays with down-link repeaters, as well as a throughput analysis showing the benefits of up-link relay assistance is also discussed below.

In this disclosure, frequency domain duplexing ("FDD") is used to separate the up-link and down-link of the radio channels connecting the UE 120 to the eNB 110 and the eNB 110 to the UE 120, respectively. LTE uses OFDM and DFT-precoded OFDM (also referred to as SC-FDMA) as the modulation formats for the down- and up-links, respectively, of the transmitted signals.

LTE is a data network. The eNB 110 and the UE 120 convert packet data into OFDM waveforms for radio transmission. The radio link controller ("RLC") groups data packets into transport blocks. The medium access control ("MAC") layer performs the HARQ protocol. The physical layer ("PHY") performs encoding and modulation. A scheduler is present in the eNB that spans the RLC, MAC, and PHY layers. It controls the resource allocation for both the up- and down-links, and the modulation coding rate. The eNB 110 also performs up-link power and timing control.

Figure 2:
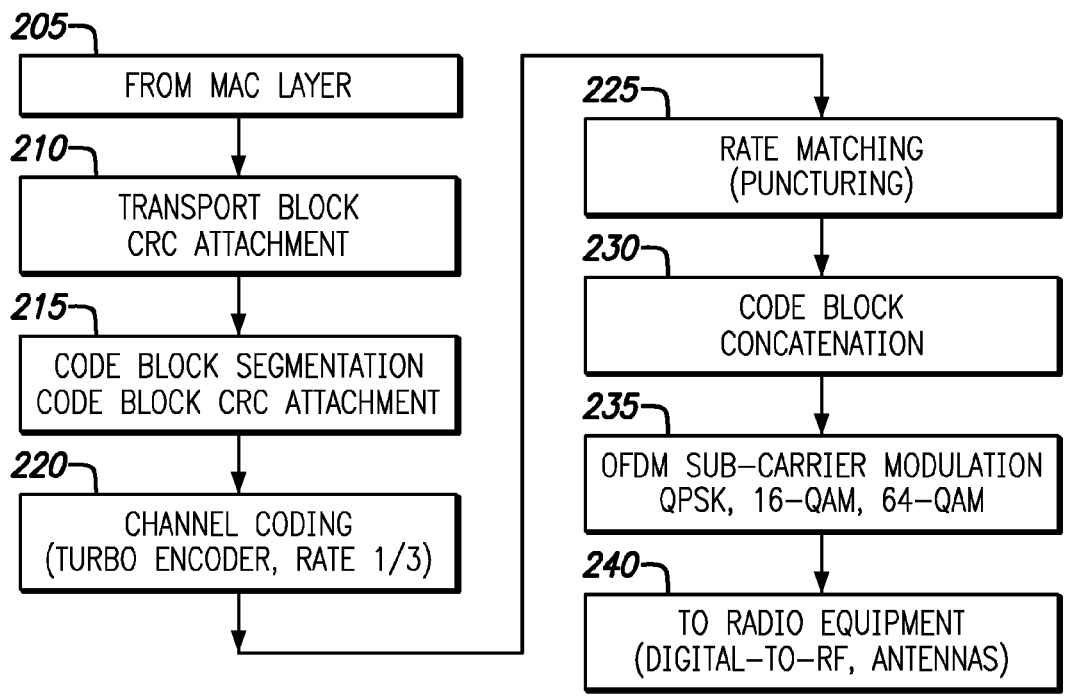
FIG. 2 is a flow chart depicting the transport channel processing within the PHY layer.

FIG. 2 shows the PHY layer in greater detail. The transport block from the MAC layer (step 205) is appended with a cyclic redundancy check ("CRC") for error detection (step 210). If the transport block size is too large for the turbo encoder (>6144 bits), it is segmented into smaller code blocks, each with its own CRC appended (step 215). The Turbo encoding redundancy increases the coded block size by a factor of three (step 220). Puncturing or repetition is used for rate matching, which adjusts the encoded block size to fit into the space allocated by the scheduler (step 225). The rate matched blocks are concatenated to obtain the desired coded transport block (step 230). The data is scrambled, modulated using QPSK, 16-QAM, or 64-QAM (step 235), then assigned to sub-carriers within the OFDM symbol (step 240).

HARQ is a protocol used to request the retransmission of transport blocks that have been decoded improperly as indicated by a CRC error. For incremental redundancy ("IR") HARQ used in LTE, the puncturing pattern applied during the rate matching is changed for each retransmission of a transport block. See J. C. Ikuno, M. Wrulich, and M. Rupp, "Performance and modeling of LTE H-ARQ," *proc. of WSA* 2009, Berlin, 2009 and M. Rumney, *LTE and the Evolution to 4G Wireless: Design and Measurement Challenges*, Agilent Technologies Publication by Wiley, 2009. The puncturing pattern used is indicated by the redundancy version. See 3GPP, TS 36.213 v8.5.0, Table 8.6.1-1. The original and retransmitted transport blocks are combined at the eNB 110 to enhance the forward error correction ("FEC") provided by turbo coding. The HARQ protocol is synchronous for the up-link, which means that if the eNB request a retransmission from the UE 120, it will always be 8 ms after the initial UE transmission. In contrast, the HARQ protocol is asynchronous for the down-link to reduce the requirements on the UE 120 to produce a timely acknowledgement (ACK or NAK).

The OFDM and SC-FDMA symbols are formed from complex modulated sub-carriers in the frequency domain, which are transformed to the time domain and appended with a cyclic prefix. Symbols are grouped into slots, sub-frames, and frames which are 0.5 ms, 1 ms, and 10 ms, respectively, in duration. The multi-access feature of LTE is achieved by partitioning the time-frequency space into resource blocks that are 12 sub-carriers in frequency and one slot in duration. Each resource block can be assigned to a different user or to a control channel used by all UEs.

The down-link frame contains many channels. Within this disclosure, the physical down-link control channel ("PDCCH") is the most important. It contains the up-link grant for UE resource blocks and the ACK/NAK for the HARQ protocol.

The resource block assignment within the down-link is dynamic, often distributed throughout the time-frequency space to minimize fading in the channel propagation to a given UE. Resource blocks vacated by one user are assigned to other UEs that are experiencing different fading characteristics to maximize the overall link quality within the cell. As a result, the down-link LTE signal transmitted from the eNB 110 and received by the UE 120 will have a wide bandwidth that occupies most of the down-link band.

The resource block assignment for the up-link is different. To reduce the burden on the UE 120 in LTE release 8, the resource blocks are assigned so that the sub-carriers occupied are contiguous in frequency. Thus, the up-link LTE signal transmitted by the UE 120 has a narrow bandwidth, although the bandwidth may hop in frequency between slots.

Figure 3:
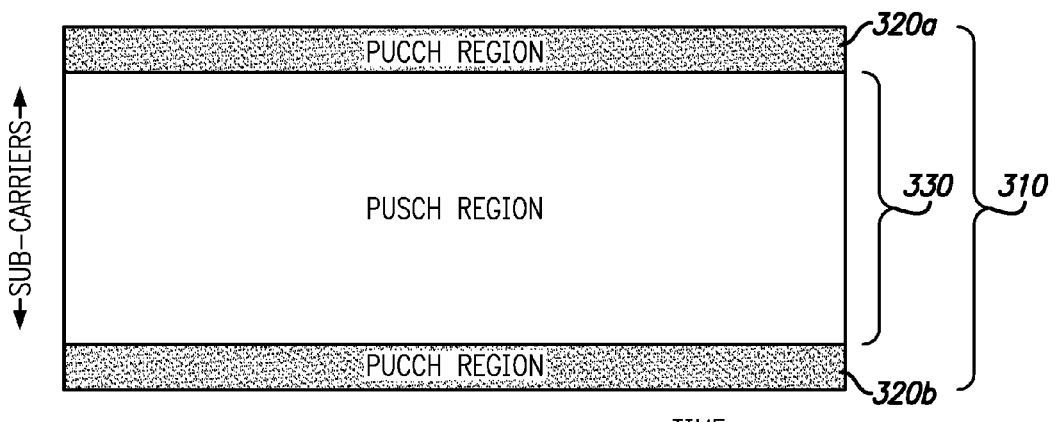
FIG. 3 is a representation of sub-carrier regions within the up-link band where the physical up-link control channel ("PUCCH") and the physical up-link shared channel ("PUSCH") can be located.

As depicted in FIG. 3, the key up-link channels include the physical up-link control channels ("PUCCH") 320*a* and 320*b* and the physical up-link shared channel ("PUSCH") 330 for the sub-carriers 310. The PUCCH is used to transmit control signals. The PUSCH 330 is used for transmitting both data and control signals. The up-link allocation of the PUSCH 330 and PUCCH 320*a* and 320*b* over time and frequency is shown in FIG. 3. The PUSCH 330, the physical random access channel ("PRACH"), and sounding reference signal (latter two not shown) share the center portion of the allocated frequency band. The PUCCH 320*a* and 320*b* are transmitted at the edges of the up-link band.

Figure 4:
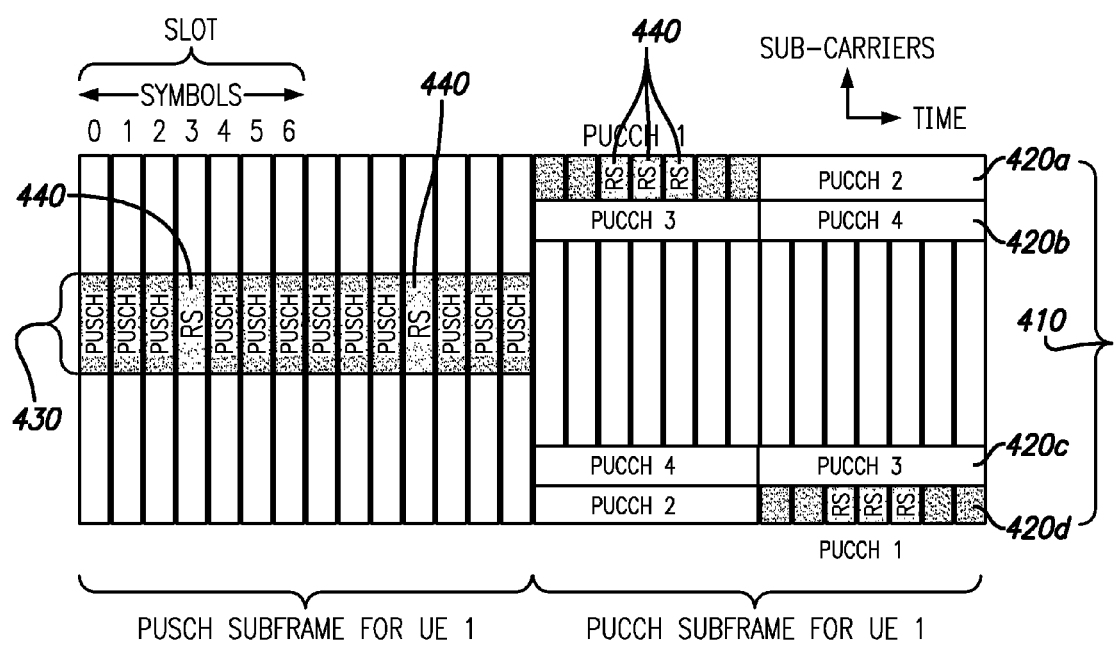
FIG. 4 is a representation of the sub-carrier usage for the PUSCH and PUCCH sub-frames.

As shown in FIG. 4, for LTE release 8, the UE 120 does not transmit on the PUSCH 430 and the PUCCH 420*a*-420*d* simultaneously. This is due to the fact that the sub-carrier usage is contiguous in frequency as mentioned earlier. The PUCCH 420*a*-420*d* are used when control signals only need to be transmitted. If control signals and data need to be transmitted concurrently, they are both multiplexed onto the PUSCH 430. Both the PUSCH 430 and the PUCCH 420a-420d contain demodulation reference signals ("RS") 440 that are used by the eNB 110 to assist in the demodulation of the UE signal.

Figure 5:
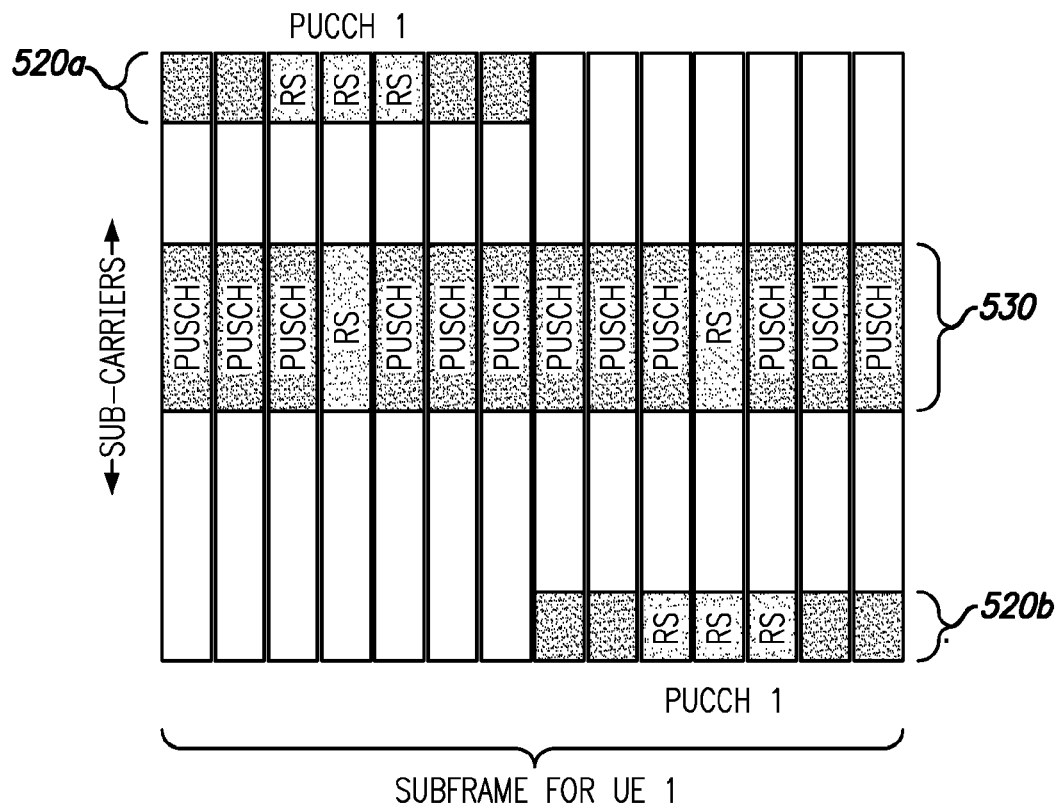
FIG. 5 is a representation of the up-link band for Long Term Evolution ("LTE") release 10 showing simultaneous transmission of the PUCCH and the PUSCH by the UE is allowed.

The up-link modulation is enhanced for LTE release 10. The SC-FDMA is replaced by DFT-precoded OFDM, which is also known as clustered SC-FDMA. As shown in FIG. 5, the resource block allocation for LTE release 10 permits the simultaneous transmission of the PUCCH 520a and 520b and PUSCH 530 in the same sub-frame by a UE. See section 6.3 in 3GPP, TR 36.814 v9.0.0. Thus, the simultaneous transmission of control and data signals may be done in two ways: by multiplexing both onto the PUSCH, as in LTE release 8; or by transmitting simultaneously the control signals on the PUCCH and the data signals on the PUSCH. The latter method simplifies the relay operation, as discussed below.

The up-link signal received by the eNB 110 has a wide bandwidth due to the reception of several UEs such as UE 120 simultaneously. The transmit time of each UE 120 within the cell 111 is adjusted so that the up-link signals received at the eNB 110 are both aligned in time and are orthogonal. See S. Sesia, I. Toufik, and M. Baker, *LTE—The UMTS Long Term Evolution: From Theory to Practice*, West Sussex, UK: Wiley, 2009. The initial time alignment is obtained during the PRACH protocol. Timing advance updates are specified thereafter in a closed-loop manner based on measurements of the received up-link timing. The granularity of the timing advance is 0.52 µs. The tolerance to misalignment is provided by the cyclic prefix used in the SC-FDMA modulation, which is typically 4.7 µs in duration. The orthogonality property results in low interference between UE signals at the eNB 110 within a given cell.

Up-link power control is used to reduce the near-far dynamic range effects, adjusting the power level transmitted by a UE such as UE 120 to compensate for the up-link path loss. See 3GPP, TS 36.213 v8.5.0. It also changes the UE transmit power based on the modulation coding rate to ensure sufficient signal-to-noise at the eNB receiver. Because rate-dependent power control assigns higher power for higher coding rates, the in-channel sensitivity of eNB receiver must be sufficient to tolerate at least 18 dB of receive power variation. See 3GPP, TS 36.104 v8.3.0, table 7.4.1-1.

A UE 120 near the cell edge, in general, transmits at a high power level to overcome the additional path loss associated with distance to the eNB receiver. However, the maximum transmitted power by the UE 120 is specified by the eNB 110 as part of the system information message to limit the interference experienced by neighboring eNB's. As a result, the up-link budget for the UE 120 near the cell edge is degraded requiring a lower data rate to meet the targeted block error rate ("BLER"). LTE release 10 seeks to increase the cell edge data rate by using repeaters and relays to improve the link budget.

Figure 6:
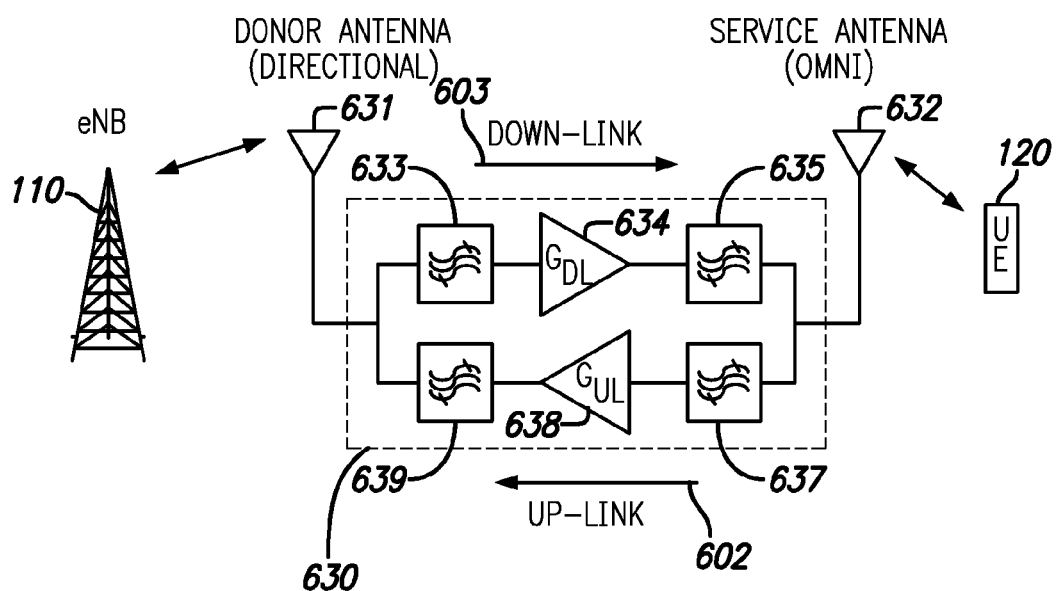
FIG. 6 is a system block diagram of a repeater communicating with the eNB and the UE.

Consider the use of repeaters to improve the cell edge data rate. As shown in FIG. 6, a bi-directional repeater ("Rp") 630 provides gain to both the up-link 602 and down-link 603 of the LTE air-interface connecting the eNB 110 and UE 120. A donor antenna 631 and a service antenna 632 are needed to receive, amplify, and retransmit the RF signal with minimal delay (on the order of a few microseconds). Filtering is applied via filters 633, 635, 637, and 639 to the repeated signal to limit the bandwidth of the signal retransmitted to that of the up- or down-link band. Down-link amplifier 634 and up-link amplifier 638 are employed to amplify the down-link signal 603 and the up-link signal 602 respectively.

Figure 7:
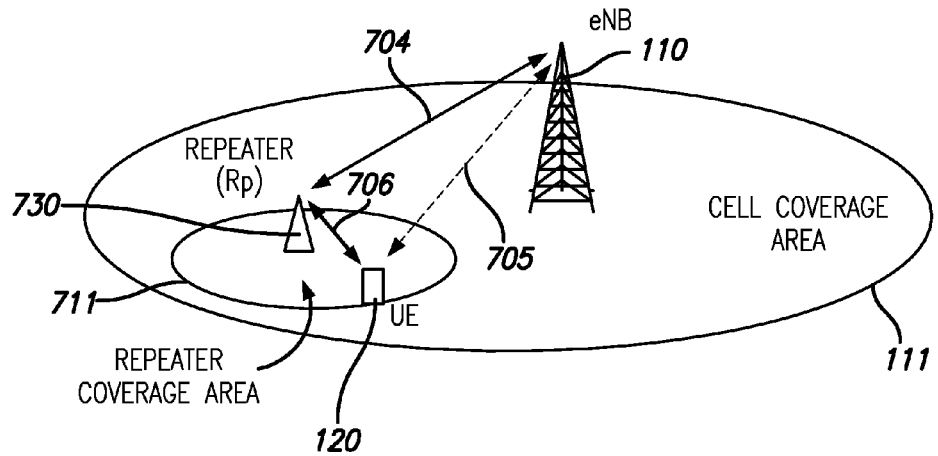
FIG. 7 is a representation of a repeater within a cell controlled by the eNB.

The antennas used on the eNB 110 and the UE 120 sides are referred to as the donor antenna 631 and the service antenna 632, respectively. Because a given link of the repeater (up or down) receives and transmits on the same frequency band, there must be sufficient isolation between antennas 631 and 632 to avoid echoes due to unwanted RF feedback. Instability occurs when the antenna isolation is less than the gain of the repeater. The donor antenna 631 is often directional to increase the feedback isolation. The directional radiation pattern also provides antenna gain improving the quality of the eNB 110-to-Rp 630 link. The radiation pattern of the service antenna 632 tends to be omni-directional and defines the coverage area as depicted in FIG. 7 where a UE 120 will experience a better channel using the repeat paths 706 and 704 communicating between the UE 120 to the Rp 730 and the Rp 730 to eNB 110 respectively, than the direct path 705 communicating between the UE 120 and the eNB 110.

When implemented properly, the repeater Rp 730 improves the signal to noise ratio ("SNR") of the signals transmitted by the eNB 110 and the UE 120 at the receivers of the UE 120 and the eNB 110, respectively. The SNR improvement allows the use of higher-order modulation coding schemes to increase the data throughput. The SNR improvement is due to the gain of the repeater 630, the directionality of the donor antenna 631, and the reduced distance (and hence propagation loss) between the UE 120 and repeater Rp 730 compared to that of the UE 120 and the eNB 110. The SNR at the eNB 110 is also increased by the diversity associated with direct path 705 and the repeated paths 704 and 706.

Figure 8:
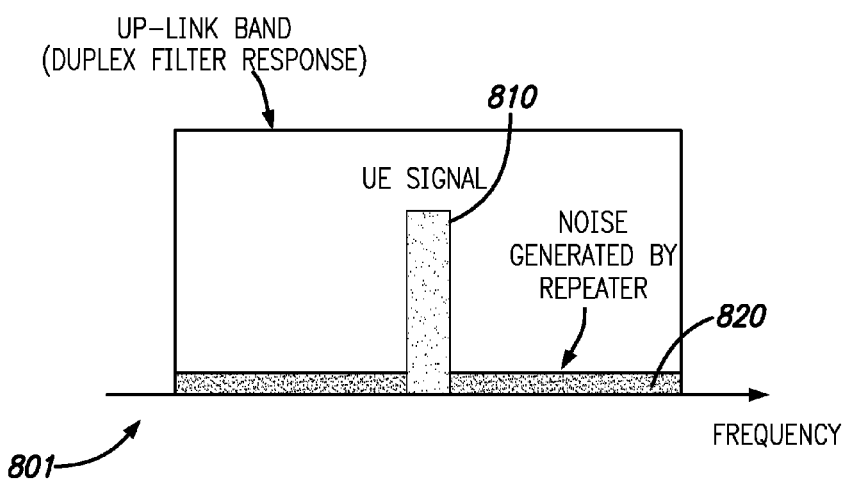
FIG. 8 depicts the spectrum of repeated UE up-link signal as seen by the receiver of the eNB.

FIG. 8 depicts the spectrum 801 of repeated UE up-link signal as seen by the receiver of the eNB 110. In addition to increasing the signal level 810 at the destination receiver, a repeater amplifies and generates noise 820 within the up- or down-link band. This tends to be more problematic for the up-link because the UE signal bandwidth is a small fraction of the up-link band. As a result, the broadband noise generated reduces the SNR of the UEs not serviced by the repeater.

Figure 9:
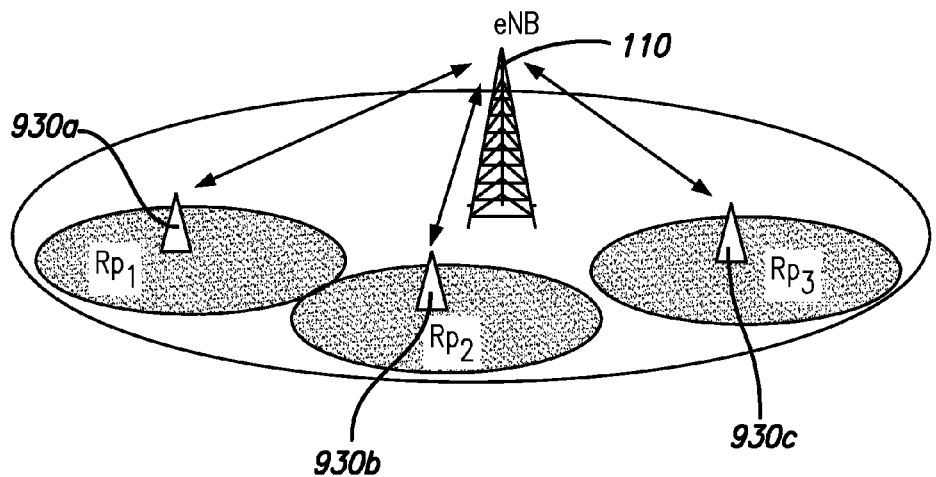
FIG. 9 is a representation of several repeaters with differing coverage areas communicating with a common eNB base station.
Figure 10:
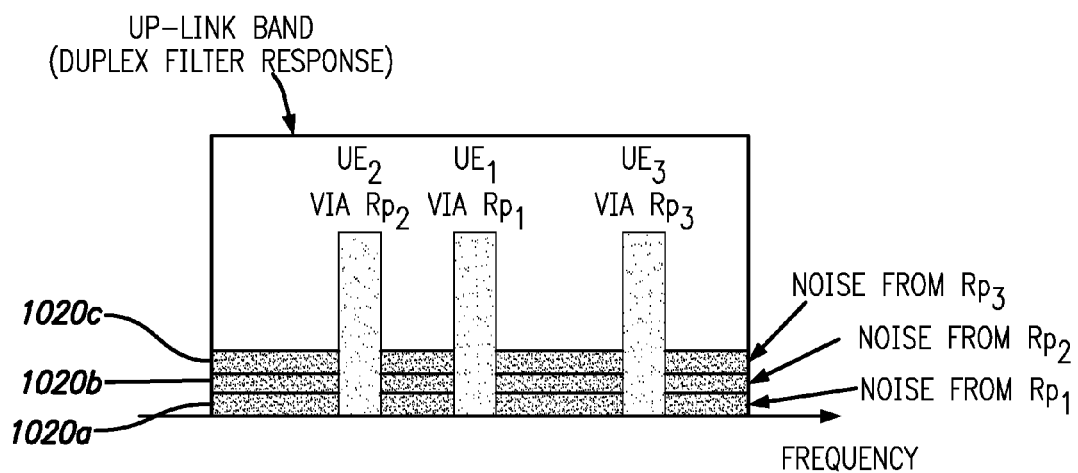
FIG. 10 depicts the spectrum of several repeaters within a cell controlled by the eNB.

Consider the case of several repeaters 930a-930c within a cell, as shown in FIG. 9. As shown in FIG. 10, the repeater generated noise 1020a-1020c increases with the number of up-link repeaters. That is, the noise from the repeaters 930a-930c adds at the receiver of the eNB 110, thereby decreasing the SNR for all of the UE signals. This represents a serious problem when the goal is to improve the cell edge data throughput because the cell may contain a ring of six or more repeaters. As a result, the benefits of the repeater in terms of increasing the capacity of the up-link are diminished.

Repeater generated noise is less problematic for the LTE down-link because the eNB 110 is transmitting to several UE receivers such as UE 120 through different repeaters having different coverage areas. Although there may be some overlap between adjacent repeater coverage areas, the noise accumulation at a given UE such as UE 120 will not rise significantly with the number of repeaters present in the cell. This is due to the fact that the same LTE down-link signal passes though each repeater. Thus, signal power accumulation will offset any noise accumulation. The down-link also operates favorably in the presence of multiple repeaters because the diversity provided by overlapping coverage areas can be exploited.

In summary, repeaters improve cell edge throughput for the down-link. However, it is not clear that the use of several repeaters will improve the up-link edge user capacity.

As mentioned earlier, relays are proposed within LTE release 10 as a means to increase the data throughput for UEs such as UE 120 near cell edges 111. A relay ("R") differs from a repeater in that the former decodes the in-coming signal, thereby removing noise and interference. However, the relay must wait several sub-frames for the eNB scheduler to assign new radio channel resources before retransmitting the data.

The RAN1 working group within 3GPP is actively studying relays for LTE release 10. Two types of relays have been identified. The first type of relay, referred to as type 1, is a fully functioning eNB that performs its own scheduling and resource allocation. A wireless backhaul is used to transfer data to the host eNB which has wired access to the network and internet. In contrast, transparent relays, referred to as type 2 relays, are characterized by the reliance on the host eNB for scheduling and resource allocation. In this disclosure, only type 2 relays are considered.

A goal of the RAN1 working group is to specify a type 2 relay that improves the up-link data rate while being compatible with LTE Release 8. The necessary coordination of transmission and reception for the relay is performed by the eNB scheduler using the HARQ protocol, where the relay transmits only during HARQ retransmissions. The assistance provided by the relay improves the channel quality by providing spatial diversity and increased received power at the eNB or UE. It reduces the likelihood that more than one HARQ retransmission would be required and allows for higher modulation coding schemes to be used.

A transparent relay has been proposed for the up-link. See R1-082517, Nortel, "Transparent relay for LTE-A FDD," RAN1 #53bis, Warsaw, Poland, June 2008. A down-link relay is also described. The up-link relay fits well into LTE because the up-link HARQ is synchronous, allowing the relay to predict when the retransmission from the UE will occur. That is, the HARQ-induced retransmission from the UE will always be 8 subframes (8 ms) after the initial UE transmission. Unfortunately, the down-link implementation has problems because the down-link HARQ is asynchronous. As a result, the relay is unable to predict when the retransmission will be made by the eNB 110. See R1-083866, Nortel, "More design aspects on downlink transparent relay in LTE-A," RAN1 #54bis, Prague, Czech, October 2008, which proposes that additional signals be sent from the eNB to the relay within an earlier sub-frame to give the relay sufficient time to prepare for the retransmission. However, this prevents backward compatibility with LTE release 8.

The RAN1 working group has concluded that a type 2 relay does not increase coverage. See R1-100951, Alcatel-Lucent, Alcatel-Lucent Shanghai Bell, CHTTL, "Type 2 relay summary," RAN1 #60, San Francisco, Calif., February 2010. Instead it is best suited for increasing the capacity of the cell and improving the data throughput for edge users. This is due to the fact that only data channels, and not the control signals, are relayed. For the case of the up-link, the relaying function need only be applied to the PUSCH, which carries the up-link data. The PUCCH and PRACH are not serviced by the relay and must be able to connect directly to the eNB. Thus, the PUCCH and PRACH range defines the coverage limits for the up-link.

Figure 11:
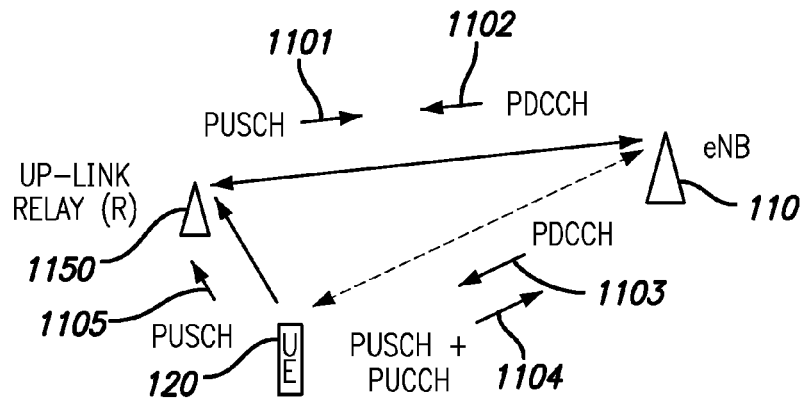
FIG. 11 is a representation of up-link data transfers between the eNB, the UE, and the HARQ relay.

The data transfer between the eNB 110, the UE 120, and the relay 1150 is shown in FIG. 11. The relay 1150 demodulates UE transmissions 1105, stores them briefly then recodes and retransmits if a HARQ request is made by the eNB in transmission 1101. It is assumed that the eNB 110 has diversity receive antennas so that the simultaneous transmissions from the UE and relay can be maximum ratio combined at the eNB receiver. FIG. 11 also shows PUSCH transmission 1101 and PDCCH transmission 1102 between the relay 1150 and the eNB 110, and PUSCH+PUCCH transmission 1104 and the PDCCH transmission 1103 between the eNB 110 and the UE 120.

The LTE type 2 relay has similarities to the cooperative relaying protocols based on HARQ as described in B. Zhao and M. C. Valenti, "Practical relay networks: a generalization of Hybrid-ARQ," *IEEE Journal on Selected Areas in Communications*, Vol. 23, No. 1, pp. 7-18, January 2005. A key difference is that the type 2 relay does not send signaling information to the UE, such as ACK/NAK messages in response to decoding of the UE transmission. The ACK/NAK messages originate from the eNB.

An open issue with the up-link HARQ relay is how to treat the CQI/PMI, RI, and HARQ-ACK parameters, collectively referred to as the control signals, which are multiplexed on the original PUSCH, during a retransmission. The relay cannot predict the new control information from the UE.

Figure 12:
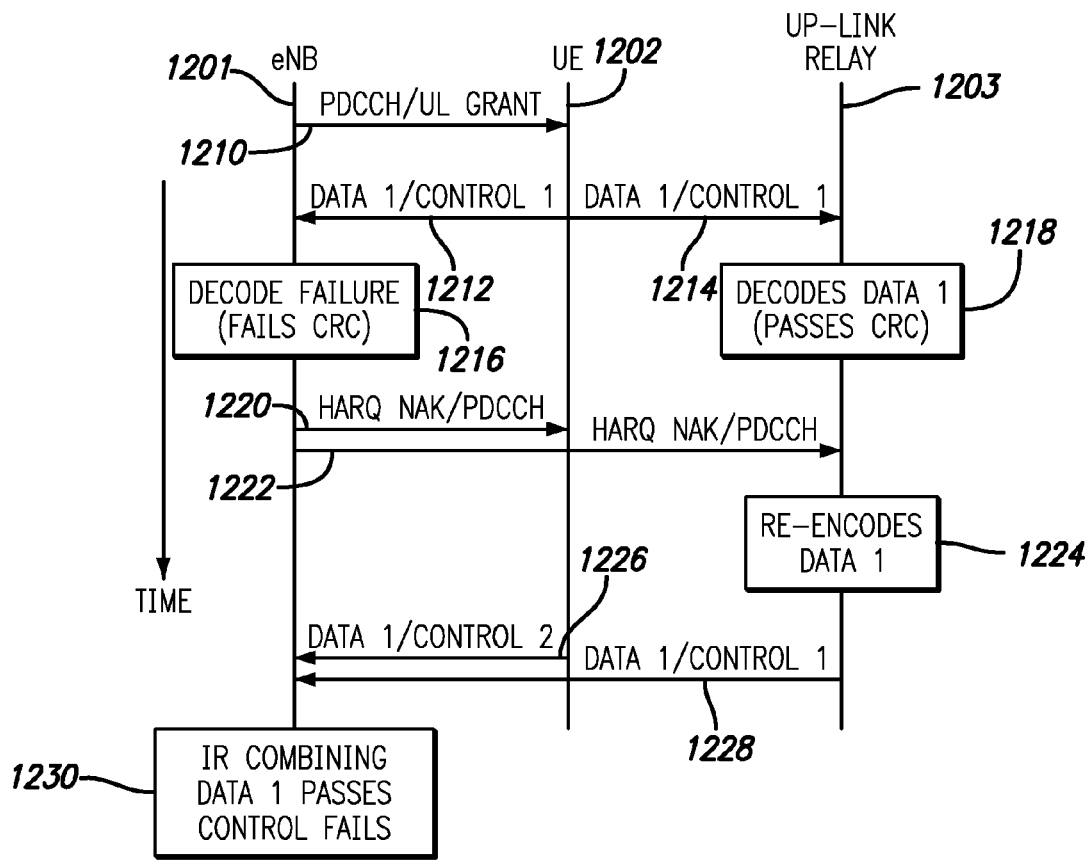
FIG. 12 is a representation of the data transfer sequence between the eNB, the UE, and the relay for up-link communication.

To illustrate the problem, consider the data transfer sequence between the eNB 1201, UE 1202, and up-link relay 1203, as shown in FIG. 12. The eNB 1201 begins by sending an up-link (UL) grant on the PDCCH 1210 to the UE 1202. The UE 1202 transmits data and control information 1212 and 1214 which both the eNB and relay receive and decode, respectively at blocks 1216 and 1218. If the eNB 1201 detects an error in the CRC at block 1216, a retransmission is requested using the physical HARQ indicator channel ("PHICH") and/or the PDCCH 1220 and 1222 (see 3GPP, TS 36.213 v8.5.0, section 8), which both the UE 1202 and the relay 1203 receive. The UE 1202 encodes and the relay 1203 encodes at block 1224 the identical data for the HARQ retransmission, assuming the relay decoded the originally transmitted UE signal correctly. Both the UE 1202 and the relay 1203 retransmit on the same up-link resources granted by the eNB scheduler via transmissions 1226 and 1228. The eNB 1201 receives and decodes the combined UE/relay signal, then performs IR (incremental redundancy) combining with the first UE signal received to improve the accuracy of the decoding at block 1230. The relay-assisted data will be decoded correctly by the eNB 1201; however, the out-dated control information sent by the relay 1203 will cause a decoding error for the received control signal.

Even if the relay 1203 decides not to transmit the control information, leaving the spaces blank, problems still arise. See R1-093044, Huawei, "Issues of type 2 relay," RAN1 #58, Shenzhen, China, August 2009. The up-link channel estimation uses the reference signals to measure the combined paths of the UE-to-eNB and the relay-to-eNB. Blanking the control signals on the relay retransmission changes the up-link channel response. Thus, the data and control signals experience different channel responses; however, only one reference signal is provided. As a result, the reception of the control signals from the UE 1202 will be blind. Thus, control signals multiplexed on the PUSCH present difficulties for the relay-assisted communication.

Figure 13:
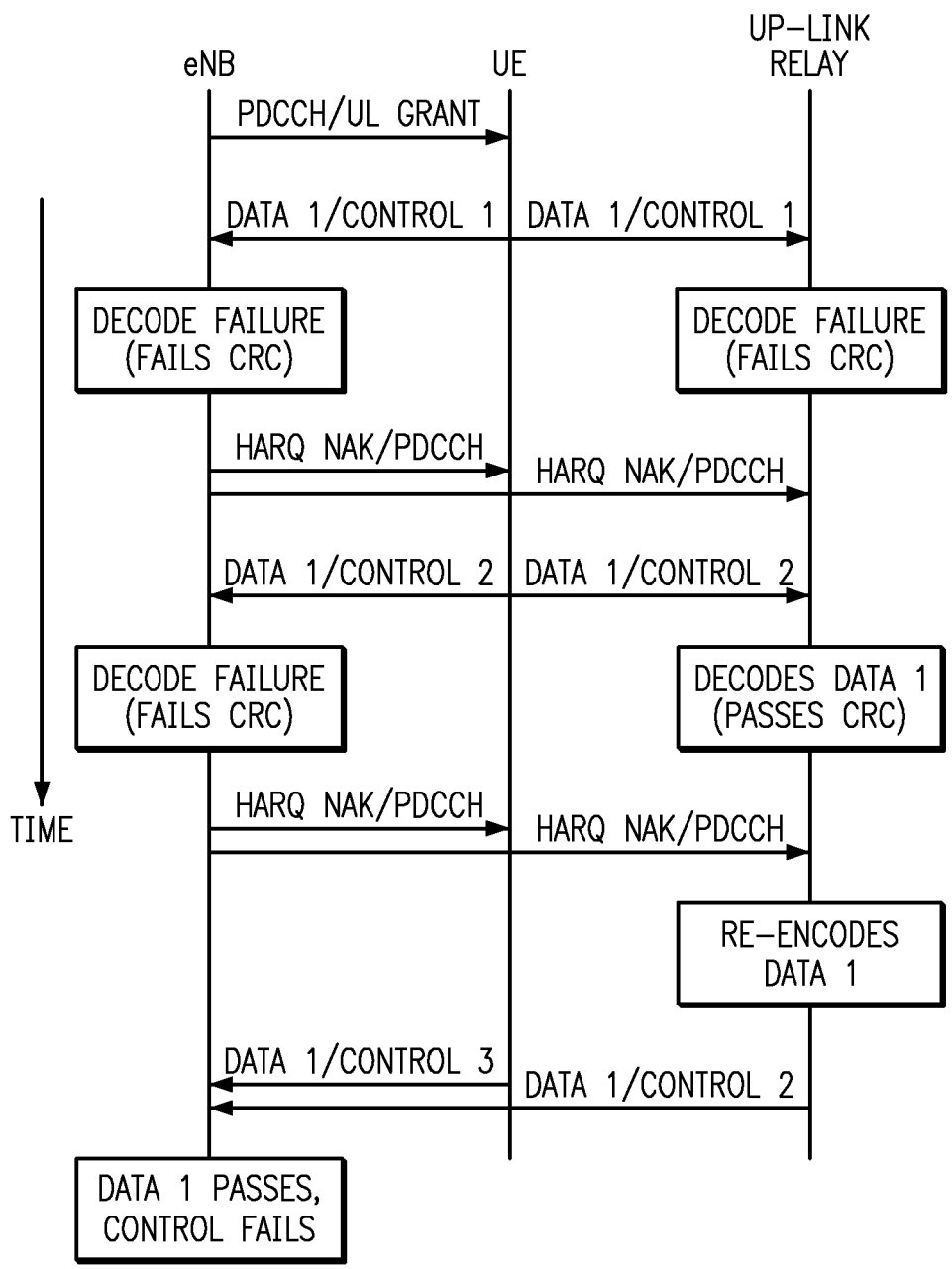
FIG. 13 is a representation of the data transfer sequence between the eNB, the UE, and the relay for up-link communication when the relay fails to decode the first UE transmission.

It is interesting to consider the data transfer sequence when the relay fails to decode the initial UE transmission, as shown in FIG. 13. The relay 1203 cannot request a retransmission, but the eNB will issue a HARQ in most cases because the UE-to-eNB link does not have the capacity for the higher modulation coding scheme used in the relay-assisted mode. The problem associated with the control signals multiplexed onto the PUSCH remains.

As mentioned earlier, a relay is different than a repeater because the former delays the retransmission by several subframes. As a result, it is possible to implement a relay using the same antenna for the donor and service functions. However, in such cases the relay cannot receive and transmit simultaneously on the up-link. The relay must time domain duplex ("TDD") its up-link frequency band between receptions of UE signals and the HARQ retransmissions of previously decoded transport blocks.

Time-domain duplexing requires that the relay be in either transmit or receive mode at any given time, which presents a scheduling challenge for the eNB when several UEs are being serviced by the relay. In such cases it is necessary to synchronize the up-link grants so that the transmissions of the serviced UEs match the reception cycle of the relay. However, a benefit of the TDD mode for the relay is that it eliminates the need for echo suppression when separate antennas are used for the donor and service functions.

Another problem exists when the relay is assisting several UEs and TDD mode is used to separate the donor and service functions. If the relay fails to decode the initial transmission from one of the UEs, the relay will miss the subsequent UE retransmission because the former is in transmission mode. An additional HARQ attempt is needed to re-synchronize the UE transmission with the relay's receive mode. As a result, the modulation coding scheme selected must be chosen conservatively in a TDD-based up-link relay assisting several UEs so that decode failures by the relay are infrequent.

In summary, the down-link relay is difficult to implement in LTE because the down-link HARQ protocol is asynchronous. The up-link relay is more promising because the up-link HARQ is synchronous allowing the relay to predict retransmissions from the UE. However, the up-link relay has to address several outstanding problems such as how to deal with the control information multiplexed within the PUSCH and the synchronization of the UE's when the up-link relay is using its TDD mode.

Figure 17:
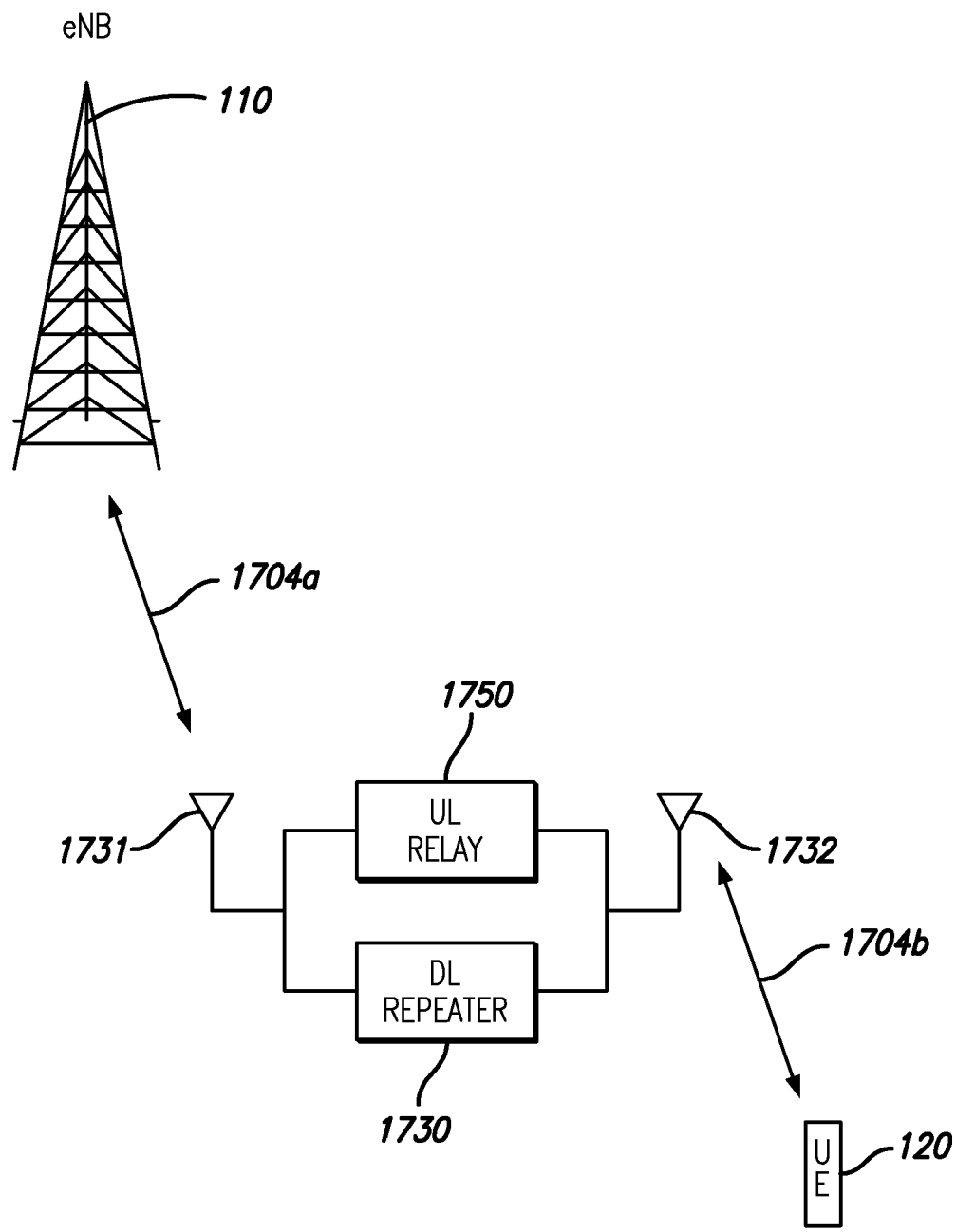
FIG. 17 is a schematic block diagram of a co-located up-link relay and a down-link repeater in an embodiment.

In accordance with an embodiment, it is proposed that the down-link portion of the relay is not necessary and can be replaced instead with a down-link repeater. FIG. 17 is a schematic block diagram of a co-located up-link relay 1750 and a down-link repeater 1730 in an embodiment. It shall be appreciated that the co-located up-link relay 1750 and the down-link repeater 1730 depicted in FIG. 17 combines the down-link portion of the repeater 630 depicted in FIG. 6 with the up-link portion of the relay 1150 depicted in FIG. 11. Thus, embodiments exhibit enhanced data throughput for cell edge UEs by combining a down-link repeater 1730 with an up-link HARQ relay 1750. The up-link relay 1750 shares the same donor antenna 1731 and the same service antenna 1732 as the repeater 1730, which allows the relay to transmit and receive simultaneously via signals 1704a and 1704b, if desired. The key difference from the RAN1 proposals is that the up-link control signals transmitted by a relay-assisted UE appear on the PUCCH during some of the HARQ retransmissions. Outdated control information multiplexed on the PUSCH transmitted by the up-link relay is ignored. This requires a modification for LTE release 8 UE's, but is consistent with LTE release 10.

Consider first the case of a LTE release 8 UE and an up-link relay 1750 that uses the TDD mode to separate the donor and service functions. During the transmission cycle of the relay, there is marginal benefit for the UE 120 to retransmit the data directly to the eNB 110 because its link is much worse than the relay 1750-to-eNB 110 link. In addition, there is no benefit for the UE 120 to transmit data to the relay 1750 when the latter is in its transmit mode because it is not listening. Instead, the UE 120 should transmit control information to the eNB 110 while the relay is in transmission mode.

Having the UE 120 transmit the current control information to the eNB 110 on the PUCCH when the relay 1750 is in transmit mode presents a solution to the PUSCH multiplexing problem which, it is believed, has not been considered by RAN1. Consider the data transfer sequence shown in FIG. 14.

From the eNB's 1201 viewpoint, it appears as if the UE 1202 is transmitting on the PUSCH 1428 and PUCCH 1426 simultaneously, which is not possible normally for LTE release 8 because the SC-FDMA modulation requires that the transmitted signal occupy a contiguous frequency band. With the new found ability to transmit both the PUSCH 1428 and the PUCCH 1426 during HARQ retransmissions (the former from the relay 1203, the latter from the UE 1202), the control information can be removed from the retransmitted PUSCH 1428 completely. An eNB 1201 enabled for LTE release 10 should have no difficulty demodulating the simultaneous reception of the PUSCH and PUCCH at block 1430. This solution requires the UE 1202 to know that it is being serviced by the relay. This may cause objections from the RAN1 group which has agreed that a release-8 UE shall not be aware of the presence of the type 2 relay. See R1-100951, Alcatel-Lucent, Alcatel-Lucent Shanghai Bell, CHTTL, "Type 2 relay summary," RAN1 #60, San Francisco, Calif., February 2010. However, if signals from incompatible release 8 UEs are not relayed, embodiments would meet the RAN1 definition.

Figure 15:
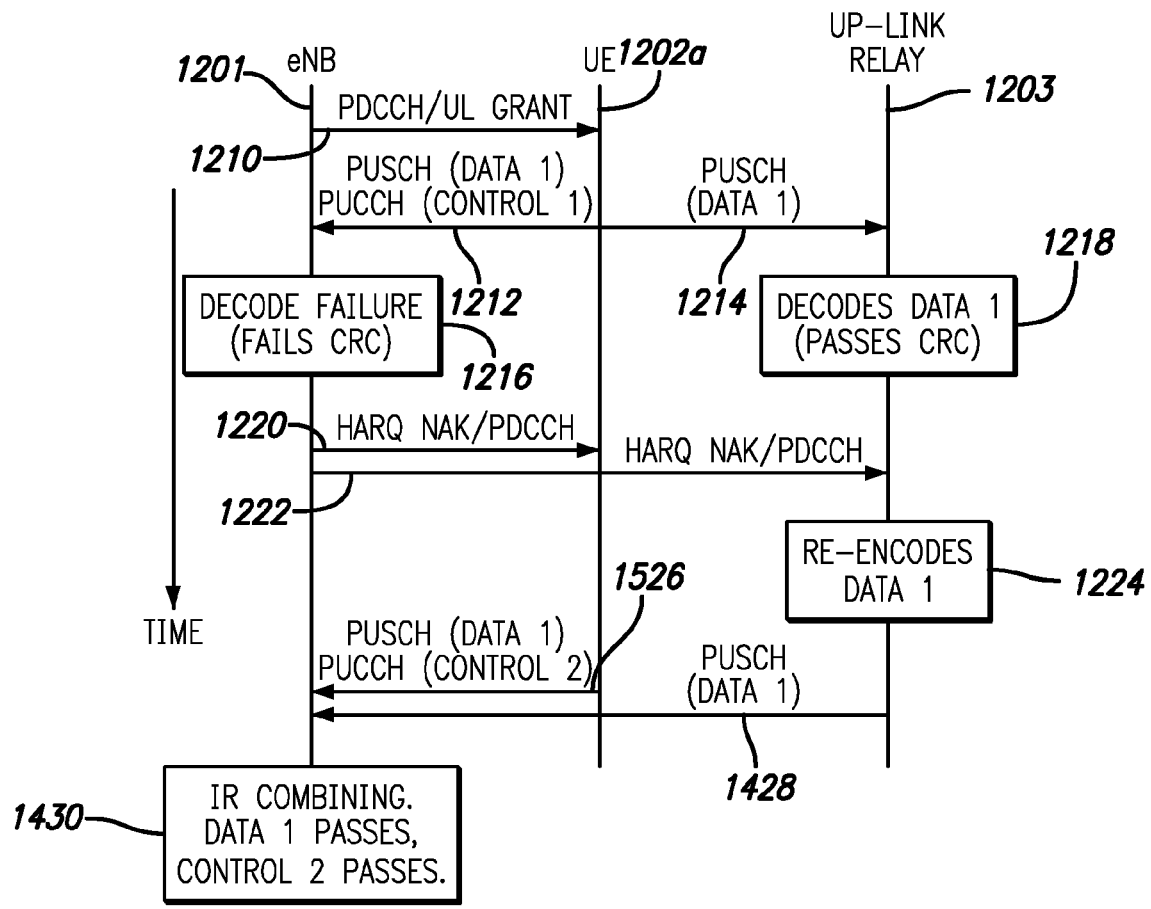
FIG. 15 is a representation of the data transfer sequence between the eNB, the UE, and the relay for up-link communication of an embodiment employing LTE release 10.

Now consider the case of a LTE release 10 UE as depicted by FIG. 15. LTE release 10 has simplified the operation of the uplink relay by allowing the simultaneous transmission of the PUSCH and PUCCH 1526 from a UE 1202a. By sending the control information separately on the PUCCH instead of multiplexing it onto the PUSCH, the most current control information is always sent by the UE 1202a. Since the modulation coding scheme used for the PUCCH is more robust, it is likely that the control information will be decoded correctly even when the data is not. As a result, control information, such as the channel quality ("CQI"), is being fed back to the eNB scheduler in a timely manner.

It is assumed in this example that the up-link relay 1750 is sharing the donor antenna 1731 and the service antenna 1732 with the down-link repeater 1730. As a result, there should be sufficient antenna isolation for the relay to transmit and receive simultaneously. This is beneficial when several UE's are being assisted by the relay 1750 because the penalty associated with a decoding failure at the relay is reduced, compared to the TDD case. This allows the modulation coding rate of the PUSCH to be selected aggressively to rely more heavily on the IR-HARQ to maximize the data throughput, instead of wasting a HARQ cycle to re-synchronize the UE transmission.

The remainder of this section describes specific details of the up-link HARQ relay 1750 and its operation within a LTE cell. The relay 1750 extracts information regarding up-link scheduling grants from the downlink control information ("DCI") format 0 messages within the PDCCH. The UE ID, referred to as the C-RNTI (cell radio network temporary identifier), is needed for each grant, which can be derived from the scrambled CRC used by the DCI. However, the computational requirements for the relay are reduced significantly if the eNB communicates the C-RNTI's of UE's selected for relay assistance ahead of time because fewer UE transmissions will have to be decoded. In addition, information from the eNB simplifies the relay processing of a semi-persistent scheduled ("SPS") UE whose uplink grant may have been sent several frames earlier.

The DCI format 0 messages within the PDCCH include the modulation and coding scheme ("MCS") index which specifies the modulation order and transport block size for the UE transmissions and the redundancy version of the HARQ for the UE retransmissions. The PDCCH also contains the up-link resource block allocation. Sufficient information is available for the relay to predict the UE transmissions, decode the UL transport blocks, and associated them with their C-RNTI's.

The relay 1750 will not transmit during a HARQ retransmission if the relay was unable to decode the initial UE transmission successfully. This occurs when the CRC of the transport block decoded by the relay 1750 indicates an error. In such cases, the relay 1750 will perform IR combining of the repeated UE 120 transmissions it receives until the decoding is successful or the eNB 110 stops requesting HARQ's from the UE 120. A UE transmission is also missed when the relay is in TDD mode and retransmitting another UE's signal.

The reception of UE 120 transmissions at the relay 1750 is slightly different from that of the eNB 110 because the timing advance and up-link power controls are set for the eNB 110. One can expect larger variations in power level and timing between UE 110 signals at the relay's receiver because path distances are different from those of the eNB 110. Timing variations less than a microsecond should not be problematic because of the cyclic prefix used in the up-link modulation.

The relay transmission requires its own timing advance and power control to avoid disrupting the balance at the eNB receiver. The relay 1750 is operated as a UE such as UE 120 initially to perform the PRACH protocol needed to extract the timing advance information. The relay 1750 would also operate as a UE periodically to maintain adequate power control and receive timing advance updates. Once the timing advance and power control values are known, the relay function can be performed. The eNB 110 can also send the C-RNTI's for UE's selected for relay assistance.

Figure 16:
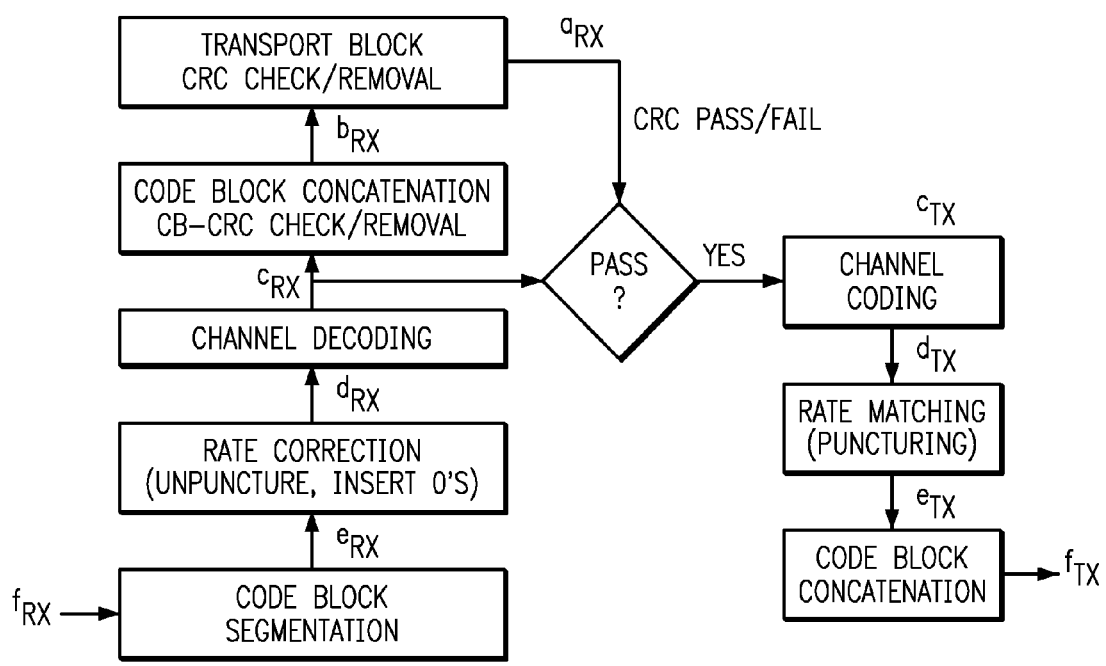
FIG. 16 is a flow chart depicting the decoding and re-coding process for the up-link relay in an embodiment.

FIG. 16 shows the decoding and re-coding process for the relay. The relay 1750 must decode the UE up-link signal to at least $c_{RX}$ for IR HARQ because puncturing changes each HARQ retransmission. Thus, the minimum sequence for the relay is $f_{RX}$, $e_{RX}$, $d_{RX}$, $C_{RX}$, $C_{TX}$, $d_{TX}$, $e_{TX}$, $f_{TX}$. It is useful to decode to $a_{RX}$ for CRC error protection; however, the subsequent re-encoding can start from $c_{RX}$ to $c_{TX}$.

Figure 14:
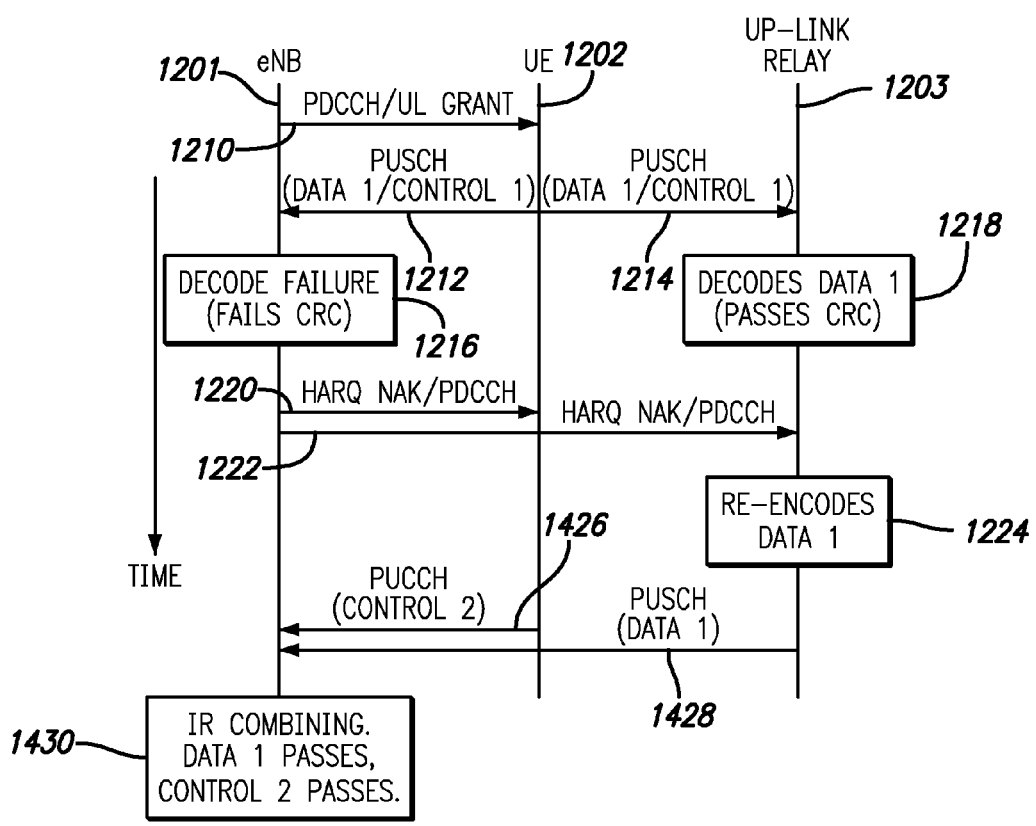
FIG. 14 is a representation of the data transfer sequence between the eNB, the UE, and the relay for up-link communication of an embodiment employing LTE release 8.

The effect of the HARQ relay on the up-link throughput is analyzed. Relays assisting release 10 compatible UE's that are capable of simultaneous transmissions of the PUSCH and PUCCH 1526, as in shown in FIG. 15, are considered first. The case when the UE is not transmitting the PUSCH and PUCCH simultaneously, as in FIG. 14, is discussed later. It is shown in both cases that assistance from the up-link relay increases the cell-edge user throughput when higher modulation coding rates can be used. However, relay assistance often increases the average number of transmissions per transport block, and hence, the average delay.

The up-link data rate that can be supported is dependent on the signal-to-noise ratio (SNR) of the transmitted UE signal measured at the eNB or relay receiver. The required SNR's for QPSK ⅓, 16-QAM ¾, and 64-QAM ⅚ modulation coding rates with a fractional throughput of 70% are specified in 3GPP, TS 36.104 v8.3.0, Table 8.2.1.1-6 as −0.4 dB, 11.5 dB, and 19.7 dB, respectively. Assumptions made in 3GPP, TS 36.104 v8.3.0 include a 20 MHz bandwidth, the receiver has two antennas, and the propagation condition is modeled using the extended pedestrian A (5 Hz). The HARQ retransmissions reduce the fractional throughput by increasing the average number of transmissions per transport block. A 70% throughput corresponds to 1.43 transmissions per transport block on average. For a fractional throughput of 30%, the average number of transmissions is 3.33 and the required SNR for QPSK ⅓, as specified in 3GPP, TS 36.104 v8.3.0 is −4.2 dB.

The expected number of transmissions per transport block, without relay assistance, is $$E[n]_{no\_relay} = \sum_{n=1}^{4} p_n \cdot n = \frac{1}{\beta} \tag{1}$$

where $\beta$ is the fractional throughput for the UE-to-eNB link and $p_n$ is the probability that n transmissions are made for a given transport block. The probabilities $p_n$ are modeled as $$p_n = \beta \cdot (1-\beta)^{n-1} \tag{2}$$

which is a simplification that does not account for the improvement in the SNR as n increases, due to the IR (incremental redundancy) combining used in the HARQ process. However, the approximation is reasonable for $\beta \geq 0.7$.

Now consider the case of relay assistance. Assume that the UE is transmitting the PUSCH and PUCCH simultaneously and the assistance of the HARQ relay guarantees that no additional retransmissions are needed (if the relay decodes the previous UE transmission correctly). The expected number of transmissions when the relay is used becomes $$E[n] = \beta + (1-\beta) \cdot \sum_{n=2}^{4} \gamma \cdot (1-\gamma)^{n-2} \cdot n \tag{3}$$

where $$\gamma = \rho + (1-\rho) \cdot \beta \tag{4}$$

and $\rho$ is the fractional throughput for the UE-to-relay link. As in the previous case, the model described by (3) does not account for the SNR improvement for $n \geq 2$ due to IR combining. However, it is a reasonable approximation when either $\beta$ or $\rho$ is large enough that $E[n] < 2$.

Let us establish an RF channel model to determine the data throughput of the relay assisted up-link. The distance-dependent path loss (L) is modeled as $$L = 128.5 + 37.2 \cdot \log_{10}(d) \tag{5}$$

where d is the distance in km from the transmitter to receiver. The antenna gains for the eNB, relay, and UE are assumed to be 15 dB, 5 dB, and 0 dB, respectively. The building penetration losses for UE and relay transmissions are assumed to be 15 dB and 0 dB, respectively. The relay-to-eNB link is 20 dB better than the UE-to-eNB link due to differences in the antenna gain and penetration losses. If the donor antenna is directional, the relay-to-eNB link is even better than described above. As a result, it is assumed that limits to the up-link data rate are due to the UE-to-eNB and UE-to-relay links only.

An approximation of the effective up-link data rate as a function of receiver SNR is (see S. Sesia, I. Toufik, and M. Baker, *LTE—The UMTS Long Term Evolution: From Theory to Practice*, West Sussex, UK: Wiley, 2009, eq. 20.3)

$$R_{data} = k^{-1} \cdot \log_2(1+SNR) \tag{6}$$

where k is a discount factor representing the practical limitations in the receiver. The effective data rates for a 70% fractional throughput of QPSK ⅓, 16-QAM ¾, and 64-QAM ⅚ are q=0.47, 2.1, and 3.5 (70% of ⅔, 3, and 5), which correspond to k=2.00, 1.87, and 1.87, respectively. For a fractional throughput of 30%, the effective data rate of QPSK ⅓ is q=0.2 and k=2.32. In order to make (6) fit the SNR values specified in 3GPP, TS 36.104 v8.3.0, we make $$k = 1.87 \cdot [1 + 0.05 \cdot SNR^{-1}]. \tag{7}$$

Note that k=1 corresponds to the Shannon limit.

In the following it is assumed that the noise powers measured by the receivers in the eNB and relay are the same. Thus, the SNR's at the eNB and relay receivers are functions of their antenna gains and path losses from the UE:

$$SNR_{UE,relay} = SNR_{UE,eNB} \cdot G_{relay} \cdot G_{eNB}^{-1} \cdot \alpha^{-3.72} \qquad (8)$$

where $$\alpha = \left[\frac{d_{UE,eNB}}{d_{UE,relay}}\right]^{-1} \qquad (9)$$

and $SNR_{UE,relay}$ and $SNR_{UE,eNB}$ are the SNR's for the UE signal at the relay and eNB receivers, respectively; $d_{UE,relay}$ and $d_{UE,eNB}$ are the distances from the UE to the relay and to the eNB, respectively; and $G_{relay}$ and $G_{eNB}$ are the antenna gains for the relay and eNB. Note that (8) ignores shadowing.

The position of the relay relative to the UE and eNB affects the throughput performance. Consider three cases: $\alpha$=[0.50 0.33 0.25]. The SNR's and data rates supported ($R_{data}$) for the UE-to-relay and UE-to-eNB links are listed in Table I, under the assumption that the power transmitted by the UE is such that $SNR_{UE,eNB}$=−0.4 dB. The SNR and data rate supported, based on (7), increase as the distance between the UE and relay decreases (lower $\alpha$).

TABLE I

SNR AND SUPPORTABLE UP-LINK DATA RATES (USING (7))

| | UE-relay $\alpha$ = 0.50 | UE-relay $\alpha$ = 0.33 | UE-relay $\alpha$ = 0.25 | UE-eNB |
|---|---|---|---|---|
| Rx SNR | 1.2 dB | 7.8 dB | 12.4 dB | −0.4 dB |
| $R_{data}$ | 0.58 | 1.49 | 2.24 | 0.47 |

Table II shows the data throughput $\eta$ and the average number of transmissions per transport block, E[n], for the unassisted up-link and relay-assisted up-link for $\alpha$=[0.50 0.33 0.25]. The available modulation coding rates for the LTE up-link are found in Table III and indicated by a CQI index that increases with the modulation code rate. $\beta$ is ratio of the supported data rate based on (7) and the CQI modulation coding rate for the UE-to-eNB link: that is, $$\beta = \frac{R_{data(eNB)}}{R_{CQI}} \qquad (10)$$

where $R_{data(eNB)}$ is the supported data rate for the UE-to-eNB link (see Table I) and $R_{CQI}$ denotes the modulation coding rate for the selected CQI index (see Table III). $\rho$ is the lesser of unity and the ratio for the UE-to-relay link: that is, $$\rho = \min\left\{\frac{R_{data(relay)}}{R_{CQI}}, 1.0\right\} \qquad (11)$$

where $R_{data(relay)}$ is the supported data rate for the UE-to-relay link (see Table I). The selected modulation coding rate is the maximum value for which E[n]<2 and the probability of more than four transmissions, denoted by P(n>4), is less than 0.01. The data throughput is $$\eta = \frac{R_{CQI}}{E[n]}. \qquad (12)$$

From Table II it can be seen that the relay assistance increases the throughput $\eta$ as well as the average number of transmissions per transport block, E[n]. Smaller values of a result in higher throughputs. The largest throughput of the cases considered, occurring for $\alpha$=0.25, is $\eta$=1.38, which is an improvement by a factor of 2.96 over the no-relay case. Reducing $\alpha$ below 0.25 provides limited incremental improvement because the higher CQI modulation coding rates needed may exceed $R_{data}$ for the relay-to-eNB link, resulting in additional retransmissions not modeled in (3).

TABLE II

RELAY-ASSISTED UP-LINK PERFORMANCE

| | CQI | $\eta$ | E[n] | P(n > 4) | $\beta$ | $\rho$ |
|---|---|---|---|---|---|---|
| No relay | 4 | 0.47 | 1.23 | 0.0025 | 0.78 | 0.00 |
| $\alpha$ = 0.50 | 5 | 0.56 | 1.56 | 0.0019 | 0.53 | 0.66 |
| $\alpha$ = 0.33 | 8 | 1.00 | 1.91 | 0.0036 | 0.24 | 0.78 |
| $\alpha$ = 0.25 | 10 | 1.38 | 1.97 | 0.0027 | 0.17 | 0.82 |

TABLE III

AVAILABLE MODULATION CODING RATES FOR LTE UP-LINK (ADAPTED FROM 3GPP, TS 36.213 v8.5.0, TABLE 7.2.3-1)

| CQI index | Mod. type | Mod. Rate (Bits/sym) | Code rate | Mod. coding rate $R_{CQI}$ |
|---|---|---|---|---|
| 0 | — | — | — | — |
| 1 | QPSK | 2 | 0.0762 | 0.152 |
| 2 | QPSK | 2 | 0.1172 | 0.234 |
| 3 | QPSK | 2 | 0.1885 | 0.377 |
| 4 | QPSK | 2 | 0.3008 | 0.602 |
| 5 | QPSK | 2 | 0.4385 | 0.877 |
| 6 | QPSK | 2 | 0.5879 | 1.176 |
| 7 | 16-QAM | 4 | 0.3691 | 1.477 |
| 8 | 16-QAM | 4 | 0.4785 | 1.914 |
| 9 | 16-QAM | 4 | 0.6016 | 2.406 |
| 10 | 64-QAM | 6 | 0.4551 | 2.731 |
| 11 | 64-QAM | 6 | 0.5537 | 3.322 |
| 12 | 64-QAM | 6 | 0.6504 | 3.902 |
| 13 | 64-QAM | 6 | 0.7539 | 4.523 |
| 14 | 64-QAM | 6 | 0.8525 | 5.115 |
| 15 | 64-QAM | 6 | 0.9258 | 5.555 |

Table IV shows the data throughput $\eta$ when the UE-to-eNB link experiences an additional 3.8 dB loss due to shadowing (UE-to-relay shadowing remains 0 dB). Although the shadowing reduces the throughput, the presence of the relay provides spatial diversity that limits the degradation compared to the no-relay case (compare $\eta$ in Tables II and IV).

TABLE IV

UP-LINK WITH 3 dB SHADOWING ON UE to eNB LINK

| | CQI | $\eta$ | E[n] | P(n > 4) | $\beta$ | $\rho$ |
|---|---|---|---|---|---|---|
| No relay | 2 | 0.20 | 1.17 | 0.0005 | 0.85 | 0.00 |
| $\alpha$ = 0.50 | 4 | 0.36 | 1.68 | 0.0000 | 0.33 | 0.96 |
| $\alpha$ = 0.33 | 7 | 0.79 | 1.86 | 0.0000 | 0.14 | 1.00 |
| $\alpha$ = 0.25 | 9 | 1.22 | 1.98 | 0.0002 | 0.08 | 0.93 |

Consider the case when the up-link relay is assisting a UE that is not transmitting the PUSCH and PUCCH simultaneously, as in FIG. 14. In such a case, the modulation coding rate should be selected conservatively so that $\rho \approx 1$, ensuring that the UE-to-relay link is robust. The expected number of transmissions, E[n], becomes $\beta+2 (1-\beta)$. For the cases of $\alpha=[0.5\ 0.33\ 0.25]$, the selected CQI indices (where $R_{CQI} \approx R_{data}$) are CQI=[4 7 8], which makes $\beta=[0.78\ 0.32\ 0.25]$. The expected number of transmissions becomes E[n]=[1.22 1.68 1.75] and the throughputs are $\eta=[0.49\ 0.88\ 1.09]$. The direct UE-to-eNB link uses CQI=4 and the resulting throughput is $\eta=0.47$. The improvement in the up-link throughput is apparent only in the latter two cases ($\alpha=0.33$ and 0.25) where the closer proximity of the UE to the relay allows the CQI index to be increased. Thus, not all UE's should be assisted by the relay; however, for the best case where $\alpha=0.25$, the relay assistance improves the up-link throughput by a factor of 2.32, which is significant.

The analysis performed above relies on the ability of (2) and (3) to model the IR-HARQ process. The model accuracy is sufficient as long as most of the transport blocks are received successfully by the eNB on either the first or second transmission. This is the motivation for selecting the CQI index such that E[n]<2 and P(n>4)<0.01. However, there are cases where a cell-edge UE experiences a poor channel requiring several HARQ retransmissions per transport block to allow the incremental redundancy ("IR") combining to raise the received SNR high enough. One example suggests that the fractional throughput is 30% (E[n]=3.33). See 3GPP, TS 36.104 v8.3.0. For these cases, general observations regarding relay assistance can be made without using (2) and (3).

The UE range is limited by the power allocated to the PUCCH transmission. For these cell-edge users, the PUCCH is transmitted at maximum power and separately from the PUSCH, even if the UE is LTE release 10 compatible. This ensures that the range and power per Hz transmitted are maximized. The data sent on the PUSCH during subsequent sub-frames has little chance of being decoded properly by the eNB on the initial transmission. For such cases, other researchers have suggested TTI bundling as an option, which requires a minimum of four, perhaps even eight, transmissions per transport block. It is believed that relay assistance is a better alternative to TTI bundling because the number of transmissions is reduced considerably and the modulation coding rate can be increased, both of which improves the data throughput.

In summary, the assistance of the up-link relay has the potential to improve significantly the data throughput for cell-edge users. However, it is important to note that the up-link relay has minimal impact on the peak or average throughput of the cell.

A combination of an up-link relay and a down-link repeater has been disclosed as a means of improving the data throughput for UE's near the cell edge in a LTE network by allowing the use of higher modulation coding rates. However, using of a HARQ relay on the up-link often increases the average number of transmissions per transport block, and hence, the average delay.

The present invention has been described primarily as a system and method for improving data throughput for cell edge users in a network using down-link repeaters and up-link relays. In this regard, the system and methods for improving data throughput are presented for purposes of illustration and description. Furthermore, the description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. A relay node comprising hardware processing circuitry configured to:
   receive and demodulate an uplink transmission from user equipment (UE) to an evolved node B (eNB);
   refrain from transmitting an acknowledgement (ACK) or negative acknowledgement (NACK) in response to demodulation of the uplink transmission; and
   re-modulate and transmit the uplink transmission to the eNB when a hybrid-automatic repeat request (HARQ) is received from the eNB for the uplink transmission.

2. The relay node of claim 1 further configured to store the demodulated uplink transmission at least until a predetermined time during which an HARQ is anticipated to be received, and
   wherein when an HARQ for the uplink transmission is received, the relay node is configured to retrieve the stored demodulated uplink transmission fir re-modulation and transmission to the eNB.

3. The relay node of claim 2 wherein when an HARQ for the uplink transmission is not received, the relay node is configured to refrain from re-modulating and transmitting the uplink transmission to the eNB.

4. The relay node of claim 2 wherein based on timing information and in response to receipt of an HARQ, the relay node is configured to transmit the uplink transmission at a time selected for receipt by the eNB for concurrent reception of a retransmission of the uplink transmission by the tJE to allow for diversity reception by the eNB, and
   wherein the uplink transmission by the relay node and retransmission of the uplink transmission by the UE utilize same uplink resources granted by the eNB.

5. The relay node of claim 4 further configured to:
   perform a physical random access channel (PRACH) protocol to extract the timing information; and
   determine power control values for use in setting a power level for the uplink transmission responsive to the HARQ.

6. The relay node of claim 2 wherein when:
   the uplink transmission received from the UE comprises both control information transmitted on a physical uplink control channel (PUCCH) and data transmitted on a physical uplink shared channel (PUSCH), and
   the HARQ indicates at least a failure of the control information on the PUCCH,
   the relay node is configured to:
   refrain from multiplexing the control information on the PUCCH for transmission to the eNB, and
   transmit the control information on the PUCCH,
   wherein the control information includes at least one of a channel quality indicator (CQI) a precoding matrix indicator (PMI) and a rank indicator (RI).

7. The relay node of claim 6 wherein when the HARQ indicates a failure of both the control information on the PUCCH and the data on the PUSCH, the relay node is configured to:
   refrain from multiplexing the control information on the PUSCH for transmission to the eNB, and
   transmit the control information on the PUCCH currently with transmission of the data on the PUSCH, wherein the transmission of the data on the PUSCH is a concurrent transmission with retransmission of the data from the to the eNB.

8. The relay node of claim 7 further configured to:
intercept a resource allocation from the eNB on the PDCH to the UE for grant of uplink resources on the PUSCH.

9. The relay node of claim 2 wherein the relay node comprises a co-located uplink relay and a downlink repeater,
wherein the uplink relay is configured to receive uplink signals, decode the received uplink signals, recode the decoded uplink signals, and transmit the recoded uplink signals, and
wherein the downlink repeater is configured to receive downlink signals, amplify the received downlink signals, and retransmit the amplified downlink signals,
wherein the downlink repeater operates without decoding or recoding the received downlink signals.

10. The relay node of claim 9 wherein an output of the uplink relay and an input of the downlink repeater are configured to be coupled to a donor antenna, and
wherein an input of the uplink relay and an output of the downlink repeater are configured to be coupled to one or more service antennas.

11. The relay node of claim 10 wherein the donor antenna is configured for a more-directional radiation pattern for communication with one or more eNBs, and
wherein the one or more service antennas are configured for providing a less-direction radiation pattern for communication with user equipment.

12. A method for relay node operation comprising:
receiving and demodulating an uplink transmission from user equipment (UE) to an evolved node B (eNB);
refraining from transmitting an acknowledgement (ACK) or negative acknowledgement (NACK) in response to demodulation of the uplink transmission; and
re-modulating and transmitting the uplink transmission to the eNB when a hybrid-automatic repeat request (HARQ) is received from the eNB for the uplink transmission.

13. The method of claim 12 further comprising storing the demodulated uplink transmission at least until a predetermined time during which an HARQ is anticipated to be received, and
wherein when an HARQ for the uplink transmission is received, the method includes retrieving the stored demodulated uplink transmission for re-modulation and transmission to the eNB.

14. The method of claim 13 wherein when an HARQ for the uplink transmission is not received, the method includes the relay node refraining from re-modulating and transmitting the uplink transmission to the eNB.

15. The method of claim 13 wherein based on timing information and in response to receipt of an HARQ, the method includes the relay node transmitting the uplink transmission at a time selected for receipt by the eNB for concurrent reception of a retransmission of the uplink transmission by the UE to allow for diversity reception by the eNB, and
wherein the uplink transmission by the relay node and retransmission of the uplink transmission by the UE utilize same uplink resources granted by the eNB.

16. The method of claim 15 further comprising:
performing a physical random access channel (PRACH) protocol to extract he timing information; and
determining power control values for use in setting a power level for the uplink transmission responsive to the HARQ.

17. The method of claim 13 wherein when:
the uplink transmission received from the UE comprises both control information transmitted on a physical uplink control channel (PUCCH) and data transmitted on a physical uplink shared channel (PUSCH), and
the HARQ indicates at least a failure of the control information on the PUCCH,
the method includes the relay node:
refraining from multiplexing the control information on the PUSCH for transmission to the eNB, and
transmitting the control information on the PUCCH,
wherein the control information includes at least one of a channel quality indicator (CQI) a precoding matrix indicator (PIT) and a rank indicator (RI).

18. The method of claim 17 wherein when the HARQ indicates a failure of both the control information on the PUCCH and the data on the PUSCH, the method includes the relay node:
refraining from multiplexing the control information on the PUSCH for transmission to the eNB, and
transmitting the control information on the PUCCH currently with a transmission of the data on the PUSCH,
wherein the transmission of the data on the PUSCH is a concurrent transmission with retransmission of the data from the UE to the eNB.

19. A non-transitory computer-readable storage medium that stores instructions for execution by one or more processors of a relay node to perform operations to configure the relay node to:
receive and demodulate an uplink transmission from user equipment (UE) to an evolved node B (eNB);
refrain from transmitting an acknowledgement (ACK) or negative acknowledgement (NACK) in response to demodulation of the uplink transmission; and
re-modulate and transmit the uplink transmission to the eNB when a hybrid-automatic repeat request (HARQ) is received from the eNB for the uplink transmission.

20. The non-transitory computer-readable storage medium of claim 19 wherein when:
the uplink transmission received from the UE comprises both control information transmitted on a physical uplink control channel (PUCCH) and data transmitted on a physical uplink shared channel (PUSCH), and
the HARQ indicates at least a failure of the control information on the PUCCH,
the relay node is configured to:
refrain from multiplexing the control information on the PUSCH for transmission to the eNB, and
transmit the control information on the PUCCH,
wherein the control information includes at least one of a channel quality indicator (CQI) a precoding matrix indicator (PMI) and a rank indicator (RI).

21. The non-transitory computer-readable storage medium of claim 19 wherein when the HARQ indicates a failure of both the control information on the PUCCH and the data on the PUSCH, the relay node is configured to:
refrain from multiplexing the control information on the PUSCH for transmission to the eNB, and
transmit the control information on the PUCCH currently with a transmission of the data on the PUSCH,
wherein the transmission of the data on the PUSCH is a concurrent transmission with retransmission of the data from the UE to the eNB.

* * * * *